(12) United States Patent
Freudendahl

(10) Patent No.: US 9,683,688 B2
(45) Date of Patent: Jun. 20, 2017

(54) THREADLESS PIPE COUPLING

(71) Applicant: AVK Holding A/S, Galten (DK)

(72) Inventor: Erling A. Freudendahl, Galten (DK)

(73) Assignee: AVK Holding A/S, Galten (DK)

( * ) Notice: Subject to any disclaimer, the term of this patent is extended or adjusted under 35 U.S.C. 154(b) by 129 days.

(21) Appl. No.: 14/394,388

(22) PCT Filed: Apr. 18, 2013

(86) PCT No.: PCT/EP2013/058037
§ 371 (c)(1),
(2) Date: Oct. 14, 2014

(87) PCT Pub. No.: WO2013/156542
PCT Pub. Date: Oct. 24, 2013

(65) Prior Publication Data
US 2015/0084329 A1 Mar. 26, 2015

(30) Foreign Application Priority Data
Apr. 18, 2012 (EP) ..................................... 12164542

(51) Int. Cl.
*F16L 21/08* (2006.01)
*F16L 27/08* (2006.01)
(Continued)

(52) U.S. Cl.
CPC .............. *F16L 21/08* (2013.01); *F16L 21/035* (2013.01); *F16L 27/0816* (2013.01);
(Continued)

(58) Field of Classification Search
CPC .. F16L 37/0841; F16L 37/0844; F16L 37/088
See application file for complete search history.

(56) References Cited

U.S. PATENT DOCUMENTS 2,021,241 A * 11/1935 Mall ....................... F16B 21/16
15/410
3,141,221 A * 7/1964 Faulls, Jr. .......... B65D 33/1666
206/1.5

(Continued)

FOREIGN PATENT DOCUMENTS

EP         0086860 A1    8/1983
EP         1850049 A2   10/2007
(Continued)

OTHER PUBLICATIONS

Office action from corresponding EPO application No. 13727809.9 dated Feb. 24, 2016 (5 pages).*

(Continued)

*Primary Examiner* — Rodney Mintz
(74) *Attorney, Agent, or Firm* — Barclay Damon, LLP

(57) ABSTRACT

A threadless pipe coupling (x00) comprises a socket (x01), a plug (x02) configured for being inserted into the socket (x01) in an insertion direction (10), a sealing member (x03) arranged between a circumferential outer surface (x04) of the plug (x02) and a cooperating inner surface (x05) of a circumferential side wall (x06) of the socket (x01), so as to provide a fluid tight seal when the plug (x02) is placed in the socket (x01), wherein the plug (x02) is retained in the socket (x01) by means of a locking member (x07) inserted in a transverse direction through a slot (x08) in the circumferential side wall (x06) of the socket (x01) to engage around the plug (x02) at a location behind the sealing member (x03) as seen in the insertion direction (10). The ends (x28, x29) of the locking member (x07) in the mounted position are located between the outer surface (x04) of the plug (x02) and the circumferential side wall (x06) of the socket (x01) as seen in a radial direction.

28 Claims, 8 Drawing Sheets

Figure 1:
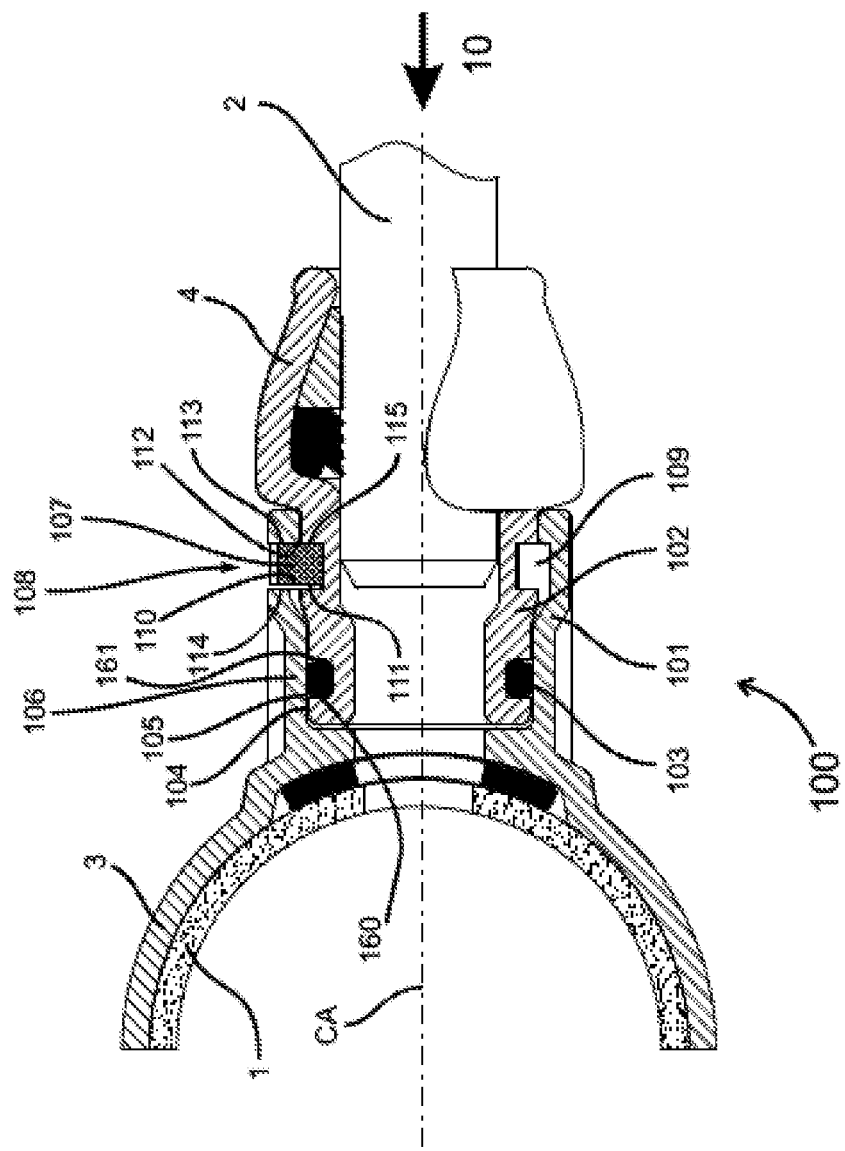

(51) Int. Cl.
*F16L 37/14* (2006.01)
*F16L 21/035* (2006.01)
*F16L 37/53* (2006.01)
*F16L 41/12* (2006.01)

(52) U.S. Cl.
CPC ......... *F16L 27/0845* (2013.01); *F16L 37/144* (2013.01); *F16L 37/148* (2013.01); *F16L 37/53* (2013.01); *F16L 41/12* (2013.01)

(56) References Cited

U.S. PATENT DOCUMENTS

| | | | | |
|---|---|---|---|---|
| 4,269,436 | A | | 5/1981 | Medney |
| 4,541,657 | A | * | 9/1985 | Smyth ................... F16L 37/086 285/305 |
| 4,591,192 | A | * | 5/1986 | Van Exel .............. F16L 37/144 285/305 |
| 4,813,716 | A | * | 3/1989 | Lalikos ................. F16L 37/088 285/148.14 |
| 5,593,187 | A | * | 1/1997 | Okuda ................... F16L 37/088 285/305 |
| 5,607,192 | A | | 3/1997 | Lee |
| 5,730,481 | A | * | 3/1998 | Szabo ................... F16L 37/144 285/305 |
| 5,964,483 | A | | 10/1999 | Long et al. |
| 7,823,594 | B2 | * | 11/2010 | Defenbaugh ............ A45D 8/20 132/273 |
| 2001/0043833 | A1 | * | 11/2001 | Bahner ................. F16L 37/088 403/187 |
| 2002/0071718 | A1 | * | 6/2002 | Marty ................. F16L 37/1225 403/293 |
| 2004/0108717 | A1 | * | 6/2004 | Matsubara ........... F16L 37/144 285/330 |
| 2010/0276924 | A1 | * | 11/2010 | Gillet .................... F16L 37/088 285/93 |
| 2010/0284732 | A1 | * | 11/2010 | Nakamura ........... F16L 37/084 403/27 |
| 2014/0326223 | A1 | * | 11/2014 | Proettel ............ F02M 35/10209 123/559.1 |

FOREIGN PATENT DOCUMENTS

| | | | | |
|---|---|---|---|---|
| EP | 1898139 A2 | | 3/2008 | |
| FR | WO 9427077 A1 | * | 11/1994 | ........... F16L 37/0841 |
| FR | 2795156 A1 | * | 12/2000 | ........... F16L 37/088 |
| FR | 2891344 A1 | * | 3/2007 | ........... F16L 37/088 |
| GB | 768974 | | 2/1957 | |
| GB | 827241 | | 3/1960 | |
| JP | 2006226421 A | | 8/2006 | |
| JP | 2006307872 A | | 11/2006 | |
| TR | WO 2011080717 A2 | * | 7/2011 | ........... F16L 33/035 |
| WO | 2011036070 A1 | | 3/2011 | |

OTHER PUBLICATIONS

EPO, International Search Report for International Application No. PCT/EP2013/058037, Date of Mailing Aug. 29, 2013, 5 pages.
EPO, Written Opinion of the International Searching Authority for International Application No. PCT/EP2013/058037, Date of Mailing Aug. 29, 2013, 6 pages.

* cited by examiner

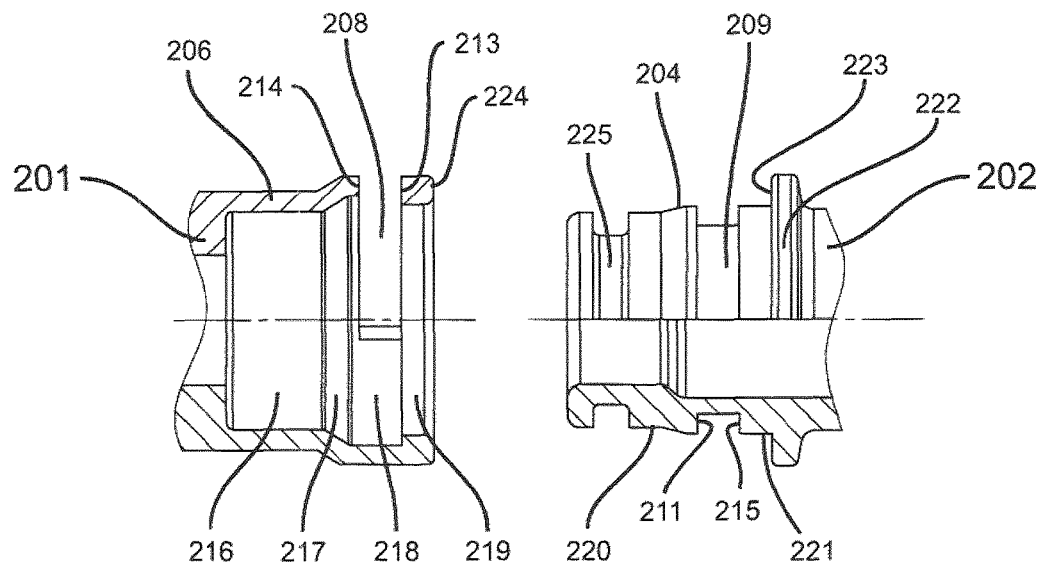
Fig. 2
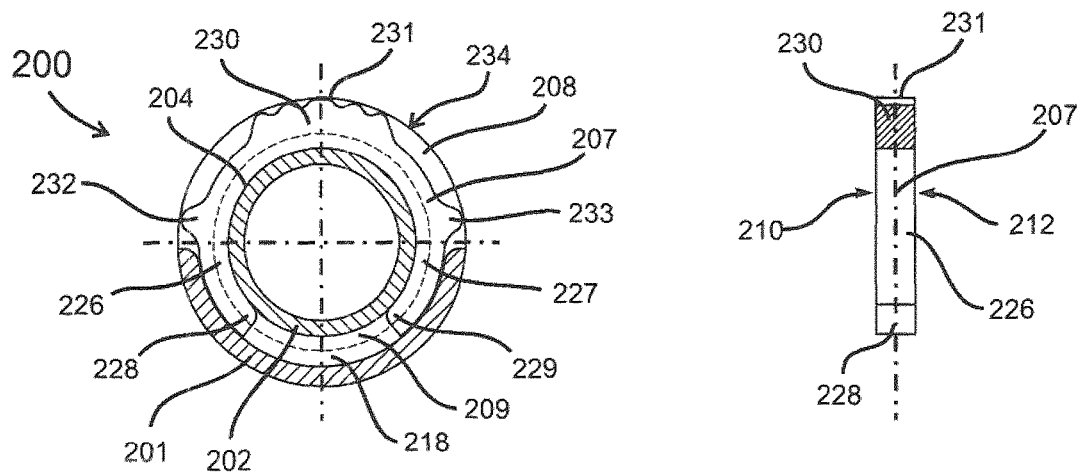
Fig. 3
Fig. 4

THREADLESS PIPE COUPLING

CROSS-REFERENCE TO RELATED APPLICATIONS

This application is a national stage application pursuant to 35 U.S.C. §371 of International Application No. PCT/EP2013/058037, filed on Apr. 18, 2013, which claims priority to, and the benefit of, European Patent Application No. 12164542.8, filed on Apr. 18, 2012. The entire contents of such applications are hereby incorporated by reference.

The invention relates to a threadless pipe coupling comprising a socket, a plug configured for being inserted into the socket in an insertion direction, a sealing member arranged between a circumferential outer surface of the plug and a cooperating inner surface of a circumferential side wall of the socket, so as to provide a fluid tight seal when the plug is placed in the socket, said sealing member comprising a first seal surface pointing in the same direction as the insertion direction and an oppositely placed second seal surface, wherein the plug is retained in the socket by means of a locking member inserted in a transverse direction through a slot in the circumferential side wall of the socket to engage around the plug at a location closest to the second seal sun face, and the ends of the locking member in the mounted position being located between the outer surface of the plug and the circumferential side wall of the socket as seen in a radial direction, the locking member comprising a first axial end face and a second axial end face pieced oppositely the first axial end face and the slot being delimited by axial contact surfaces.

Within the scope of the present application, fluid may relate to a liquid, in particular water, as well as to a gas. In particular, the threadless pipe coupling of the present invention is configured for use in building and operating pipe lines and/or distribution networks for oil, water and/or gas supply.

Known pipe couplings, in particular in the field of oil, water and gas supply are commonly threaded couplings or couplings requiring the tightening of threaded fasteners in a flange, which are time consuming to connect.

Furthermore, such threaded couplings are often made of metal, steel, and in particular cast iron, due to the ease of production combined with the well-known strength of such materials. However, the surface of the thread of such a connection is difficult to protect against corrosion, e.g. with a protective coating, since such a protection either affects the functioning of the thread or because the protection wilt be damaged during the assembly of the pipe coupling. Thereby the reliability of the coupling is affected, in particular when used in a harsh environment, such as underground use or when otherwise exposed to corrosive environments. A further disadvantage of such threaded couplings is that it sometimes may be difficult to control the positioning of the connected parts with respect to rotation around an axial direction, for instance when installing a valve in a pipe line and/or when it is desired to branch off eta tap from a main supply line in an arbitrary direction.

U.S. Pat. No. 5,607,192 and GB 7138274 discloses a tube connection construction as described in the introduction. A disadvantage of this coupling is that under axial load there is a risk that the locking member disengages from the recess it is placed in. This is due to the construction of the engaging surfaces between the locking member and the recess.

U.S. Pat. No. 4,269,486 and GB 827,247 discloses a tube connection where locking is achieved by inserting a flexible element through an aperture. A disadvantage of such solution is that coupling and locking by inserting the flexible element constitute a cumbersome process.

The object of the present invention is therefore to provide a quick coupling that is both simple to connect and at the same time provides a safe and reliable coupling for use in supply pipe lines/networks.

According to one aspect of the invention a threadless pipe coupling as described in the introduction is provided and the axial end faces are converging outwards in a radial direction and the axial contact faces are converging outwards in radial direction.

The present pipe coupling is of the plug-in type, wherein a male plug is introduced into a female socket in an insertion direction and secured against separation in a separation direction opposite to the insertion direction by inserting locking means in a transverse direction perpendicular to the insertion/separation direction. Accordingly in the context of the present application the terms "axial" and "transverse" are defined with respect to the direction of insertion/separation wherein an axial direction is defined as parallel to the insertion/separation direction, and wherein a transverse direction is defined as perpendicular to the axial direction.

The sealing means ensures a sealed, i.e. fluid tight, connection forming a fluid passage through the plug and socket. Typically, the principal axis of the fluid passage formed by the pipe coupling is also parallel to the axial direction. Preferably, the sealing means is a sealing member, such as an O-ring or a sealing member with any other known suitable sealing profile. The coupling comprises retaining means for retaining the plug in the sealed engagement with the socket.

In order to connect the coupling, the plug is inserted into the socket in the insertion direction. When the plug is placed in the socket the sealing means, preferably an elastic sealing member, forms the fluid tight seal between the circumferential outer wall of the plug and the inner surface of the receiving cavity formed by the circumferential side wall of the socket. The socket has a slot provided in the circumferential side wall through which the locking member is inserted when the plug is placed in the socket. Tensile axial forces may arise due to external forces acting on a pipe coupling from the outside, and/or may arise as a consequence of fluid overpressure as compared to the surroundings acting on the pipe coupling from the inside. The tensile axial forces acting on the pipe coupling force the plug in a direction out of the socket, i.e. in a direction opposite to the insertion direction. Compressive axial forces may arise e.g. due to under-pressure/vacuum inside the pipe as compared to the surroundings. The compressive axial forces acting on the pipe coupling force the plug in a direction out of the socket, i.e. in the same direction as the insertion direction. The locking member interacts with the plug and the socket to take up any tensile axial forces trying to remove the plug from the socket and preferably also to take up any compressive axial forces trying to move the plug into the socket beyond a desired insertion position with a pre-determined insertion depth.

Under axial load the inclined cooperating axial surfaces interact to generate a radially inward directed force on the locking member so as to keep the locking member in the engaged position.

In case the surfaces are not plane but more or less rounded, it is to understand that the tangent to the surface in question defines the converging direction.

The locking member is arranged behind the sealed joint formed by the sealing means as seen in the insertion direction. Thereby the seal of the pipe coupling is independent of the means for mechanical connection securing the plug to the socket. The locking member engages around the plug. To that end, the locking member preferably encloses more than half the peripheral contour of the plug, and preferably also interacts with the plug to provide the retaining/locking effect with respect to the socket along more than half the peripheral contour. Thereby, the retaining strength of the coupling against axial forces is improved, in particular against tensile axial forces acting in opposite directions on the plug and the socket, but also against compressive forces.

In one embodiment the plug may be formed on a pipe end as a sample circumferential rim, keeping the sealing means in place before the rim (i.e. between the pipe end and the rim), wherein the rim at the same time provides an axial abutment face for retaining the plug in a cooperating socket with the help of a locking member placed behind the rim (i.e. on the opposite side of the rim than the sealing member).

The threadless pipe coupling is rapidly and easily assembled without any need for tools, by inserting the plug into the socket and subsequently locking the position of the plug by insetting the locking member through a slot in the circumferential sidewall of the socket. The threadless pipe coupling may also rapidly and easily be disassembled by simply removing the locking member and putting the plug and socket apart. However, in order to avoid accidental separation of the pipe coupling it is important to avoid any unintentional removal of the locking member. Therefore, the ends of the locking member in the mounted/inserted position are located between the outer surface of the plug and the circumferential side wall of the socket as seen in a radial direction, thus being hidden from the outside. Thereby the ends of the locking member are protected from any interference with influences from the outside that might damage the lacking member or cause the locking member inadvertently to be released from its engagement with the plug, or even inadvertently push the locking member completely out of the pipe coupling resulting in an accidental separation of the pipe coupling with a serious leakage of e.g. water or gas as a consequence.

Further, according to one embodiment of a threadless pipe coupling according to the invention at least one axial end face is inclined and the other axial end face is perpendicular to the longitudinal axis of the pipe coupling and the axial contact surfaces, each pointing towards the end axial faces and being formed with an equivalent angled surface.

Further, according to one embodiment of a threadless pipe coupling according to the invention both the axial end faces are inclined and converging outwardly with the same angle and the axial contact surfaces have an equivalently formed angled surface.

Thereby, the fitting between the two parts is improved.

Further, according to one embodiment of a threadless pipe coupling according to the invention the smallest distance between the converging axial contact surfaces is d1 and the largest distance between the axial end faces is substantially d1.

Thereby, the locking member fits into the slot in order to improve the safety, the smallest distance between the axial contact faces is placed furthest away from the central axis while the largest distance between the axial end surfaces is placed closest to the central axis.

Further, according to one embodiment of a threadless pipe coupling according to the invention at feast one axial contact surface is provided with a circumferential recess placed in an area closest to a central axis of the pipe coupling and the facing axial end face is provided with a circumferential shoulder adapted to engage the recess when the locking member is placed in the slot.

Thereby, the fastening of the locking means is improved.

Further according to one embodiment of a threadless pipe coupling according to the invention, a first axial end face of the locking member cooperates with an axial abutment face provided on the plug and a second axial end face of the locking member opposite to the first end face cooperates with an axial contact surface provided, on the socket so as to take up tensile axial forces pulling plug and socket apart from each other.krav2

The retaining effect is achieved by the locking member interacting with both the plug and the socket through cooperating bearing surfaces in the axial direction. The cooperating bearing surfaces are formed by axial end faces of the locking member and the one or more cooperating axial abutment surfaces on the plug, in combination with the one or more cooperating axial contact surfaces provided on the socket. The bearing surfaces take up forces in the axial directions so as to retain the plug in its inserted position in sealed engagement with the socket and providing at least as traction relief for the sealed connection. The first end face and the second end face of the locking member are oriented in opposite directions. The axial end faces of the locking member thus interact with at least one axial abutment surface provided on the plug, and at least one axial contact surface on the socket oppositely oriented with respect to the corresponding axial abutment of the plug.

When the pipe coupling is assembled, the abutment faces of the plug and the corresponding contact faces of the socket face towards each other embracing the locking member. The axial abutment lace of the plug is located before the locking element, and the corresponding axial contact surface of the socket is located behind the locking element as seen in the insertion direction. The tensile forces pull the axial abutment face of the plug towards the cooperating first end face of the locking element, which transfers the force via the second end lace to the corresponding axial contact surface of the socket. The plug and socket thus exert oppositely directed forces on the locking member in an axial direction. The lacking member thus takes up the tensile forces acting on the pipe coupling. Thereby the plug is retained in the socket preventing the pipe coupling from being separated by the axial tensile forces.

Advantageously, the plug and socket may further comprise secondary axial abutment and contact faces, respectively. The secondary axial abutment faces of the plug and the secondary axial contact faces of the socket interact with the first and second end faces of the locking member so as to take up compressive axial forces acting on the pipe coupling to push the plug in the insertion direction towards the socket.

Furthermore, the secondary axial abutment faces of the plug and the corresponding secondary axial contact faces of the socket are oriented towards each other embracing the locking member. However, the secondary axial abutment face of the plug is located behind the locking member and the secondary axial contact surface of the socket is located before the locking member as seen in the insertion direction. Thereby the insertion depth of the plug is defined by the interaction of the secondary abutment and contact faces with the locking member in combination with the retaining effect of the above mentioned primary abutment and contact faces the lacking member may thus restrain or even lock the axial position of the plug in the socket.

Advantageously, the abutment faces of the plug may be formed by a circumferential groove in the outer surface of the plug and/or one or more circumferential beads/rims/flanges provided on the outer surface of the plug. The axial contact surfaces of the socket may be formed by the axially oriented faces of the locking member insertion slot and/or by a groove/rim/flange on the inside of the circumferential sidewall of the socket.

Further, according to one embodiment of a threadless pipe coupling, the locking member is horseshoe-shaped having a first leg and a second leg, distal ends of the first leg and the second leg being separated by a gap and proximal ends opposite to the distal ends being connected to each other by a bridge. The legs of the horseshoe-shaped locking member are configured to engage around the plug thereby keeping the locking member in place. The gap opening of the horseshoe shape defined by the distal ends of the legs is hidden inside the socket between the circumferential outer surface of the plug and the circumferential side wall of the socket. Thereby, the risk of unintentional interference with the distal ends of the locking member is avoided and inadvertent separation of the threadless pipe-coupling is avoided.krav3

In a preferred embodiment, the gap width of the locking member is less than the outer diameter at the waist of the plug where the locking member is to be placed. Thereby the locking member is further secured against inadvertent release from its inserted position. Upon insertion of the locking member through the insertion slot of the socket, the distal ends of the locking element are brought into contact with the outer surface of the plug. Advantageously, the distal ends of the locking member are appropriately shaped so as to facilitate spreading of the legs of the locking member as the locking member is pushed further in a transverse direction into the slot and onto the outer surface of the plug where the distal ends of the legs first make contact. This may be achieved by a shape that converts the transversely applied force to a radially outward directed force acting on the legs of the locking member as they first meet the surface of the plug and slide over it to eventually snap into place between the circumferential wall of the socket opposite to the slot and the outer surface of the plug. For example, the surface of the distal ends may be configured to be tangential to the outer surface of the plug at the first contact during insertion, and further may be rounded to maintain a more or less tangential contact as the distal ends of the locking element slide over the outer surface of the plug. Further advantageously, the friction between the locking member and the plug during insertion may be reduced by an appropriate choice of materials for the surfaces and/or by applying a lubricating agent.

Further, according to one embodiment of a threadless pipe coupling, the locking member is a spring clip configured to engage around the plug by snap-fit. A snap-fit engagement ensures that the transversely inserted locking member is automatically kept in place in its inserted position thus allowing for very quickly establishing a reliably sealed fluid connection by means of the threadless pipe coupling.

According to one embodiment of a threadless pipe coupling, the locking member is a spring clip configured to engage around the plug by snap-fit.

Further, according to one embodiment of a threadless pipe coupling, the locking member in the inserted position does not extend outside a projected contour of the surface of the socket as seen in projection along the axial direction. Thereby, the risk of interference with external influences leading to the inadvertent releasing of the locking means is further reduced. As further detailed below, gripping means may be provided on the locking means, in order to facilitate the intentional removal of the locking means for disconnecting the coupling.krav5

Further, according to one embodiment of a threadless pipe coupling, at least one of the axial end faces of the locking member and the cooperating abutment face of the plug and/or the cooperating contact surface of the socket are perpendicular to the axial direction and parallel to each other.krav6

Pairs of cooperating bearing surfaces that are oriented perpendicular to the axial direction and parallel to each other transfer/take up the axial forces acting on the pipe-coupling also in an axial direction. By providing such axial bearing surfaces, generation of radial components, and in particular of radially outward oriented force components acting on the locking member is avoided that otherwise may lead to an inadvertent ejection of the locking member from its inserted position when an axial load is applied to the pipe-coupling.

A first axial end face of the locking member that is perpendicular to the axial direction may thus cooperate with an axial abutment face of the plug that is parallel thereto to form a pair of axial bearing surfaces. Accordingly, a second axial end face of the locking member that is perpendicular to the axial direction may cooperate with an axial contact surface of the socket that is parallel thereto to form another pair of axial bearing surfaces.

Further, according to one embodiment of a threadless pipe coupling, at least one of the axial end faces of the locking member is convex conical and the cooperating abutment surface on the plug or the cooperating contact surface of the socket is concave conical so as to press the locking member radially inwardly when the cooperating surfaces are pressed towards each other as an axial load is applied to the pipe coupling. By providing concave conical surfaces on the plug and/or socket, wherein the cooperating first and/or second end faces of the locking member are convex conical, an axial load applied to the pipe coupling generates a radially inward directed force component acting on the locking member, thereby keeping the locking member in the inserted position. The axial load may be tensile axial forces pulling the plug out of the socket in a separation direction opposite to the insertion direction and/or compressive axial forces pushing the plug into the socket in the insertion direction. The term concave conical refers to conical surfaces where the surface normal vector points inwardly towards a centre axis of the pipe coupling. Accordingly, the term convex conical refers to conical surfaces where the surface normal vector points outwardly, i.e. away from the centre axis of the pipe coupling.

According to one embodiment of a threadless pipe coupling, at least one of the axial end faces of the locking member is convex conical and the cooperating abutment face on the plug and/or the cooperating contact surface of the socket is concave conical so as to press the locking member radially inwardly when the cooperating surfaces are pressed towards each other as an axial load is applied to the pipe coupling.

Further, according to one embodiment of a threadless pipe coupling, the locking member is provided with extension flaps hinged to the distal ends of the first leg and the second leg. The extension flaps allow for increasing the effective engagement surface of the locking element, and for increasing the fraction of the peripheral contour involved in the retaining/locking interaction between the locking element and the plug/socket. The extension flaps are configured to extend into the gap between the distal ends of the legs of the horseshoe-shaped locking element so as to close or at least reduce the gap. Preferably, the locking element with extension flaps encloses the circumference of the plug, thereby providing a retainment/locking effect that is uniformly distributed around the circumference of the pipe-coupling.

According to one embodiment of a threadless pipe coupling, the locking member is provided with extension flaps hinged to the distal ends of the first leg and the second leg.

Further, according to one embodiment of a threadless pipe coupling, one or more gripping means are provided on the locking member, wherein the gripping means are configured for gripping the locking member for removing the locking member from the inserted position. Gripping means for unmounting the locking ring preferably include ears and/or depressions configured to allow for engaging the locking member with fingers, thus allowing for removal of the locking member by hand without the need for additional tools. Alternatively or in addition thereto, the gripping means may include recesses and/or projections configured for being engaged by a corresponding gripping tool. The gripping means are to be provided in locations on the locking member that are accessible from outside of the socket when the locking member is in its inserted position. For example, since the distal ends in the inserted position are hidden inside the circumferential wall of the socket, gripping means provided at the distal end are not suited for the purpose of removing the locking member from its inserted position.

According to one embodiment of a threadless pipe coupling, one or more gripping means are provided on the locking member for gripping the locking member for removing the locking member from the inserted position.

Advantageously, a protective flange/rim is provided on the socket around any projecting gripping means so as to provide a projected contour of the outer surface of the socket that encloses the locking means as seen in an axial projection. Thereby inadvertent release of the locking means due to interference with larger tools, such as digging tools in an underground installation, is avoided, whereas the intentional removing of the locking means from the inserted position using fingers, small hand tools, or dedicated gripping tools is made easier.

Further, according to one embodiment of a threadless pipe coupling, the pipe coupling comprises a plurality of locking members. Preferably, each locking member interacts with respective cooperating axial abutment faces on the plug and corresponding cooperating contact surfaces on the socket. By using a plurality of locking members, retaining and/or locking of the plug in the socket are improved. By providing redundancy with additional locking elements, the safety of the pipe coupling is enhanced.

According to one embodiment of a threadless pipe coupling, the pipe coupling comprises a plurality of locking members.

Further, according to one embodiment of a threadless pipe coupling, the sealing member is pre-mounted on the outer surface of the plug. Preferably, the sealing member is kept in place by means of a circumferential groove in the outer surface of the plug and/or by one or more radial outwardly projecting flanges on the outer surface of the plug. Pre-mounting the sealing means avoids the need of handling the sealing means when connecting the pipe coupling. Alternatively to pre-mounting the sealing means on the plug, the sealing means may be pre-mounted in the socket. However, pre-mounting on the plug is somewhat easier to handle in production, or when replacing or inspecting a seal e.g. during maintenance work.

According to one embodiment of a threadless pipe coupling, the sealing member is pre-mounted on the outer surface of the plug.

Advantageously, the circumferential side wall of the socket comprises two chambers with different inner diameters in the receiving cavity formed by the circumferential side wall, in an outer chamber close to the receiving opening of the socket, the inner diameter meets or exceeds the outer diameter of the plug with the uncompressed elastic sealing means, such as an O-ring, mounted on the outer surface of the plug. In an inner chamber, where the sealed joint is to be formed, the inner diameter has a value below the sealing means in an uncompressed state as required to achieve a fluid tight connection. Between the outer chamber and the inner chamber a transition region is provided where the inner diameter of the receiving cavity of the socket decreases gradually/smoothly from the inner diameter of the outer chamber to the inner diameter of the inner chamber. Preferably the inner chamber, the outer chamber and the transition region are circular in cross-section as seen in a transverse cut-plane perpendicular to the axial direction. Thereby the insertion of the plug into the socket and where applicable the compression of any elastic sealing means pre-mounted on the plug is simplified and the risk of damages to the sealing means during the insertion is reduced. Further advantageously, the slot for insertion of the locking means is provided in the outer region of the socket. Thereby the risk of damages to the sealing means during the insertion is further reduced.

Further, according to one embodiment of a threadless pipe coupling, the pipe coupling comprises a plurality of sealing members, thereby improving the seal. Furthermore, the redundancy of the additional sealing means increases the reliability of the pipe coupling seal.

According to one embodiment of a threadless pipe coupling, the pipe coupling comprises a plurality of sealing members.

Further, according to one embodiment of a threadless pipe coupling, the pipe coupling further comprises radial guiding/centering means and/or axial support means so as to reduce any slackness of the pipe coupling with respect to tilting and/or canting of the plug with respect to the socket. Thereby, the reliability of the seal and the reliability or the mechanical connection provided by the pipe coupling is enhanced.

According to one embodiment of a threadless pipe coupling, the pipe coupling further comprises radial guiding/centering means and/or axial support means so as to reduce any slackness of the pipe coupling with respect to tilting and/or canting of the plug with respect to the socket.

Advantageously, radial guiding/centering means may comprise one or more centering rings arranged behind the sealing means and/or further advantageously arranged behind the locking means. A centering ring may be conically tapered so as to wedge the plug in a centered position in the socket and avoid tilting/canting of the plug with respect to the socket. Advantageously, axial support means may comprise axial bearing faces on the plug cooperating with corresponding axial bearing surfaces on the socket to prevent the plug from tilting/canting with respect to the socket. A plurality of radial centering means and/or a plurality of axial support means and/or any combination of one or more centering means with one or more axial support means will further act to relief the sealing means from inappropriate deformation due to tilting or canting, of the plug with respect to the socket, thereby avoiding any risk of failure of the seal.

Advantageously, according to one embodiment, the plug and/or the socket are made of cast iron encapsulated with a corrosion protective coating. Preferably, the corrosion protective coating is a powder-coating, such as an epoxy powder-coating. Alternatively, the plug and/or socket may also be made of other materials suitable for underground operation and corrosive environments, such as plastic materials, corrosion resistant metal alloys or corrosion protected metal alloys.

Advantageously, according to one embodiment, the locking member is made of a plastics material, such as POM. The material chosen for the locking member should in general be relatively stiff with respect to compression in the axial direction, yet providing sufficient elasticity in the radial direction in order to allow for transverse insertion of the locking member around the plug, preferably engaging around the plug with a spring-elastic snap effect. An example for a plastic material fulfilling such conditions is polyoxymethylene (POM), which is a relatively stiff, elastic material suitable for providing a spring effect, and which is compatible with the requirement of avoiding damage to e.g. an epoxy powder coating of the plug and/or socket other suitable plastics materials may include thermoplastic materials suitable for production by injection moulding, as long as sufficient stiffness against axial compression can be provided and in so far as required sufficient elasticity in a radial direction may be achieved to allow for insertion of the locking member in a transverse direction. Alternatively, the locking member may also be made of metal or metal alloy, such as resilient steel, preferably stainless steel.

In case a corrosion-protective coating is provided on the plug and/or socket, any damage to such coating when inserting the locking member should be avoided. Advantageously, this may be achieved by making the locking member from a material with a surface that is sufficiently soft so as to not induce scratches/damage on the surface of the plug and/or socket. Alternatively or in addition thereto, the locking member should advantageously be shaped so as to avoid sharp edges on those parts that come in contact with the surface of the plug and/or socket during insertion of the locking member and preferably also when the locking member is in its inserted position.

Further, according to a preferred embodiment of a threadless pipe coupling, the circumferential outer surface of the plug and the cooperating inner surface of the circumferential side wall of the socket have a circular cross-section as seen in a transverse cut-plane perpendicular to the axial direction/insertion direction. Thereby, the threadless pipe-coupling is configured to allow the plug to be freely rotatable with respect to the socket around a central axis along the axial direction. This allows an easily adjust able rotational positioning of the plug with respect to the socket at arbitrary angles of rotation around the central axis, i.e. the axis of rotational symmetry which is parallel to the axial direction and comprises the respective centres of the concentrically aligned circular cross-sections of the plug and socket.

According to one embodiment of a threadless pipe coupling, the circumferential outer surface of the plug and the cooperating inner surface of the circumferential side wall of the socket have a circular cross-section.

Further, according to one embodiment of a threadless pipe coupling, the plug of the assembled pipe coupling is freely rotatable with respect to the socket around a central axis (CA) parallel to the axial direction.

Further, according to one embodiment of a threadless pipe coupling, a stopping means is provided limiting or preventing rotation of the plug with respect to the socket around a central axis parallel to the axial direction. While a circular cross-section of the plug and socket allows for free rotation of the plug with respect to the socket of the connected pipe coupling, it may in certain cases be desirable to prevent such rotation by providing a locking stop or at least limit the rotation to a pre-determined angular range by providing limit stops. A locking stop may be useful, e.g. for securing the pipe coupling against rotation when using a tapping tool to connect a building line to a main supply line. A limiting stop may be useful, e.g. for limiting the angular range of orientation of a valve with respect to a pipe line which it intercepts. A predetermined limited angular range covers less than 360 degrees of rotation, for example 270 degrees, 180 degrees, 120 degrees or 80 degrees. Stopping means may be implemented for example as one or more cooperating radial projections and recesses provided on the plug and the socket.

According to one embodiment of a threadless pipe coupling, a stopping means is provided preventing rotation of the plug with respect to the socket around a central axis (CA) parallel to the axial direction.

Further, according to one embodiment, a threadless pipe coupling further comprises a protective sleeve applied around the socket, wherein the protective sleeve encapsulates the locking member in the inserted position and seals the slot of the socket. The sleeve prevents ingression of dirt, mud or fluids from the outside that might attack or otherwise corrupt the pipe coupling. The protective sleeve thereby protects the pipe coupling in harsh environments. The protective sleeve further secures the locking member against inadvertent removal from the inserted position, thereby achieving an even more reliable connection. The sleeve is particularly advantageous in embodiments where the locking element does not project from the surface of the socket.

According to one embodiment of a threadless pipe coupling, it further comprises a protective sleeve, wherein the protective sleeve encapsulates the locking member in the inserted position and seals the slot of the socket.

Advantageously, according to one embodiment, the protective sleeve is axially slidable between a first axial position granting access to the slot for inserting/removing the locking member and a second axial position preventing access to the slot for the locking member. Further advantageously, according to one embodiment, the protective sleeve is rotatably slidable around the peripheral surface of the socket between a first rotational position granting access to the slot for inserting/removing the locking member and a second rotational position preventing access to the slot for the locking member. Further advantageously, according to a preferred embodiment, the slidable protective sleeve is held in the second position by a snap-fit engagement. Advantageously, the snap-fit may be provided by a rim on the inwardly facing surface of the protective sleeve that engages the locking member insertion slot of the socket when brought into the second axial and/or rotational position. Alternatively or in addition to the protective sleeve the pipe coupling may comprise a sheath of foil encapsulating at least the socket and sealing the slot of the socket. Preferably, the sheath is made of a shrink-hose material configured to conformly fit around the assembled pipe-coupling. Thereby, a sealed encapsulation is provided protecting the pipe-coupling from influences from the outside, such as corrosion or dirt ingression, and further securing the locking member against inadvertent removal from its inserted position.

According to a further aspect of the invention, a plug for a threadless pipe coupling is provided, wherein the plug is configured for use in a threadless pipe coupling according to any of the above-mentioned embodiments.

According to a further aspect of the invention, a socket for a threadless pipe coupling is provided, wherein the socket is configured for use in a threadless pipe coupling according to any of the above-mentioned embodiments.

According to a further aspect of the invention, a locking element for a threadless pipe coupling is provided, wherein the locking element is configured for use in a threadless pipe coupling according to any of the above-mentioned embodiments.

According to a further aspect of the invention, a saddle clamp, for establishing a tapping joint to a water or gas supply line is characterised in that it comprises a plug for a threadless pipe coupling and/or a socket for a threadless pipe coupling, wherein the plug and socket are configured for use in a threadless pipe-coupling according to any of the above-mentioned embodiment. Accordingly, a tapping joint to a water or gas supply line is characterised in that it comprises a threadless pipe-coupling, according to any of the above-mentioned embodiments. Furthermore, a tapping tool for establishing a tapping joint to a water or gas supply line is characterised in that it comprises a plug for a threadless pipe coupling and/or a socket for a threadless pipe coupling, wherein the plug and socket are configured for use in a threadless pipe-coupling according to any of the above-mentioned embodiments. Use of a threadless pipe coupling according to any of the above-mentioned embodiments significantly simplifies the tasks of establishing and operating tapping joints. Tapping joints are used when branching off a new line from an existing line, for example when branching off a building lateral line from a main water or gas supply line.

In the following, the invention is further explained referring to exemplifying embodiments, wherein in general like numerals refer to like parts. The drawings show on FIG. 1 An axial cross-sectional view of a threadless pipe coupling according to one embodiment.

FIG. 2 An axial cross-sectional view of a socket and a plug for a pipe coupling according to another embodiment.

FIG. 3 a transverse cross-sectional view of the pipe coupling of FIG. 2 with the plug placed in the socket and a locking element inserted.

FIG. 4 an axial cross-sectional view of the locking element of FIG. 3.

Figure 5:
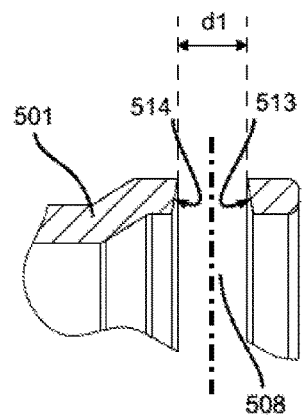

FIG. 5 an axial cross-sectional detail of a socket according to an embodiment of a threadless, pipe coupling.

Figure 5B:
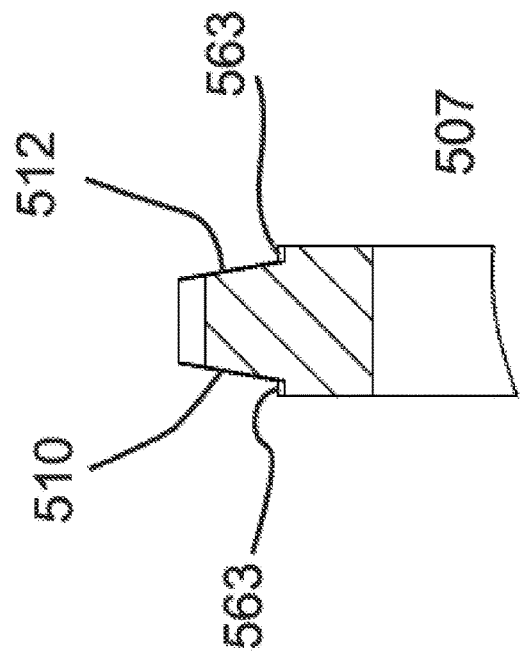
Figure 5A:
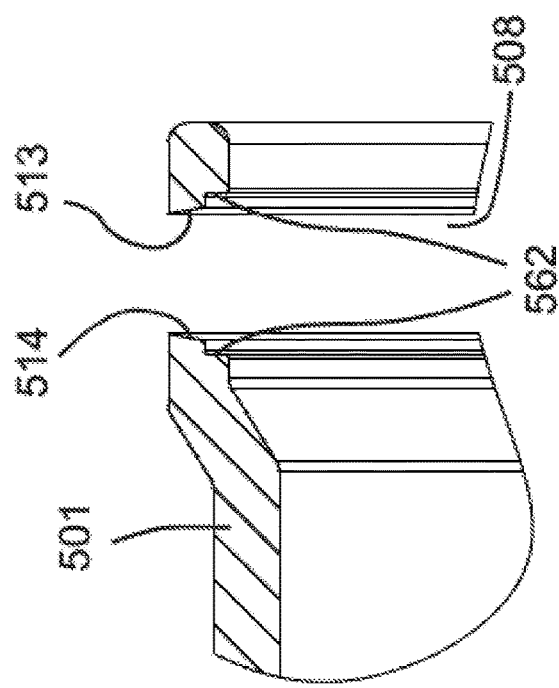

FIG. 5a an axial cross-sectional detail of a socket according to an embodiment of a threadless pipe coupling, said socket comprising a recess.

FIG. 5b an axial cross-sectional detail of a locking member for the pipe coupling of FIG. 5a comprising a shoulder.

Figure 6:
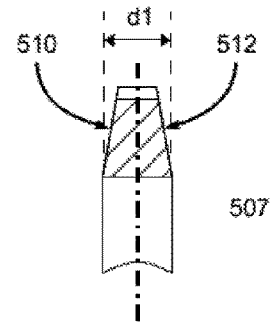

FIG. 6 an axial cross-sectional detail of a locking member for the pipe coupling of FIG. 5.

Figure 7:
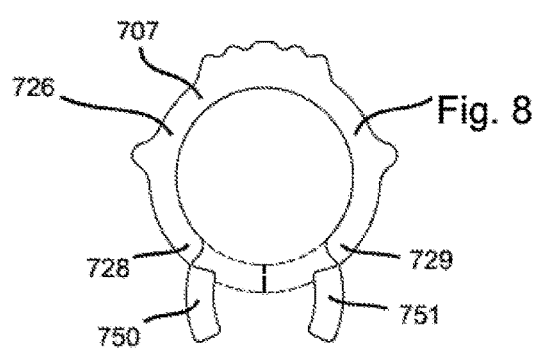

FIG. 7 an end elevations view of a locking element comprising extension flaps.

Figure 8:
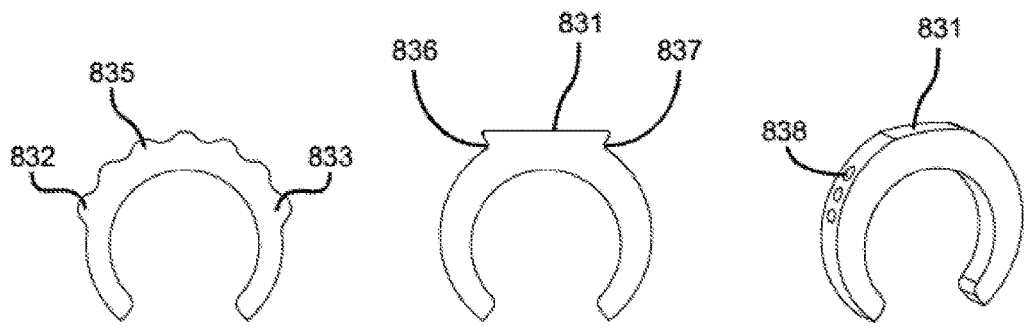

FIG. 8 different embodiments of locking elements comprising gripping means.

Figure 9:
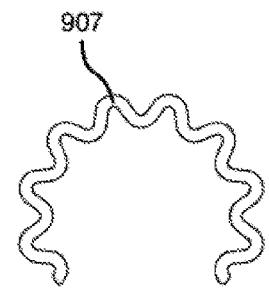

FIG. 9 a further embodiment of a locking element.

Figure 10:
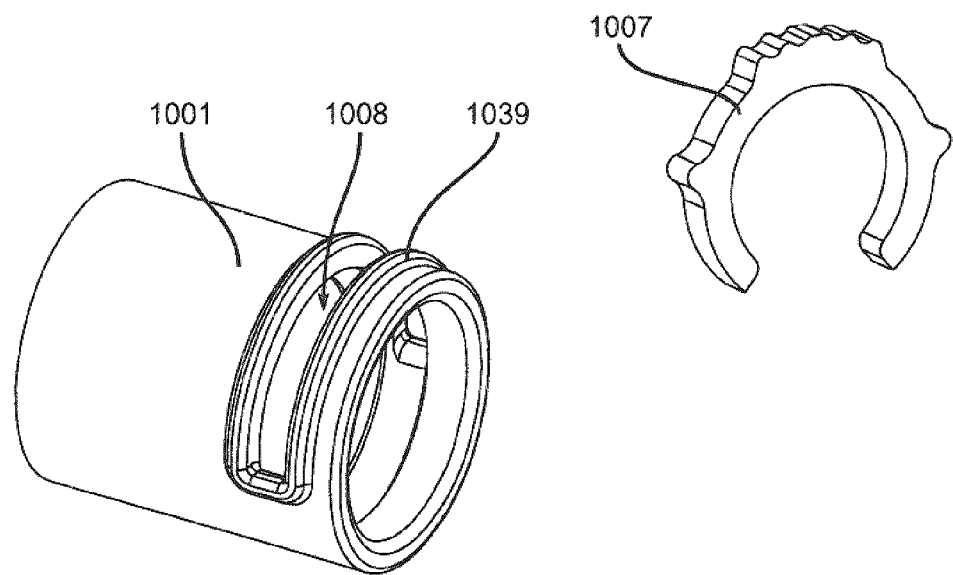

FIG. 10 a perspective devotional view of a socket and a corresponding locking element for a threadless pipe coupling according to a further embodiment.

Figure 11:
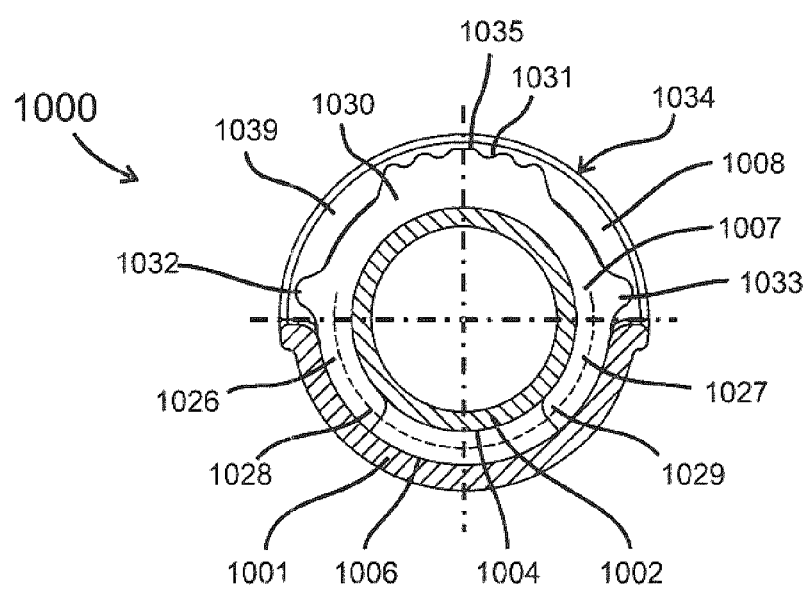

FIG. 11 a transverse cross-sectional view of the pipe coupling of FIG. 9 with a plug placed in the socket and the locking element inserted.

Figure 12:
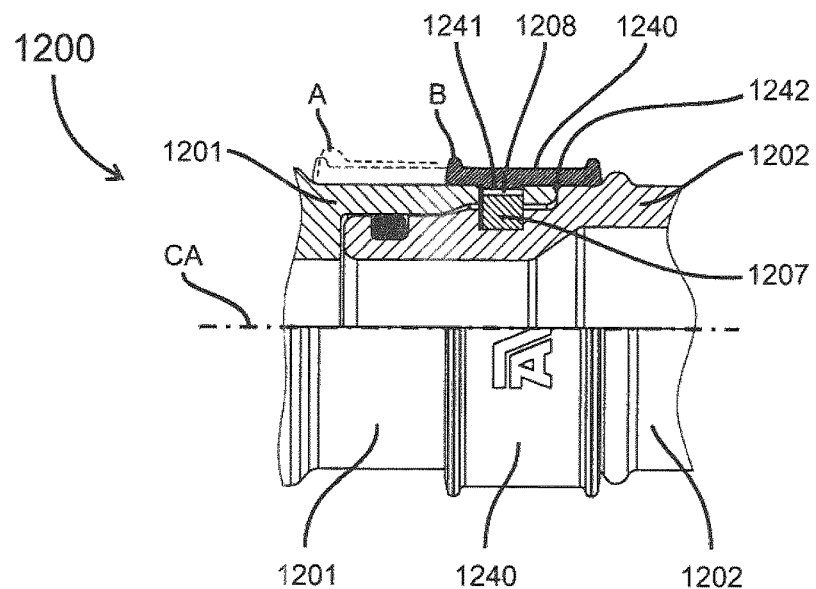

FIG. 12 a side elevational view partially cut away of a pipe coupling according to a further embodiment comprising a protective sleeve.

Figure 13:
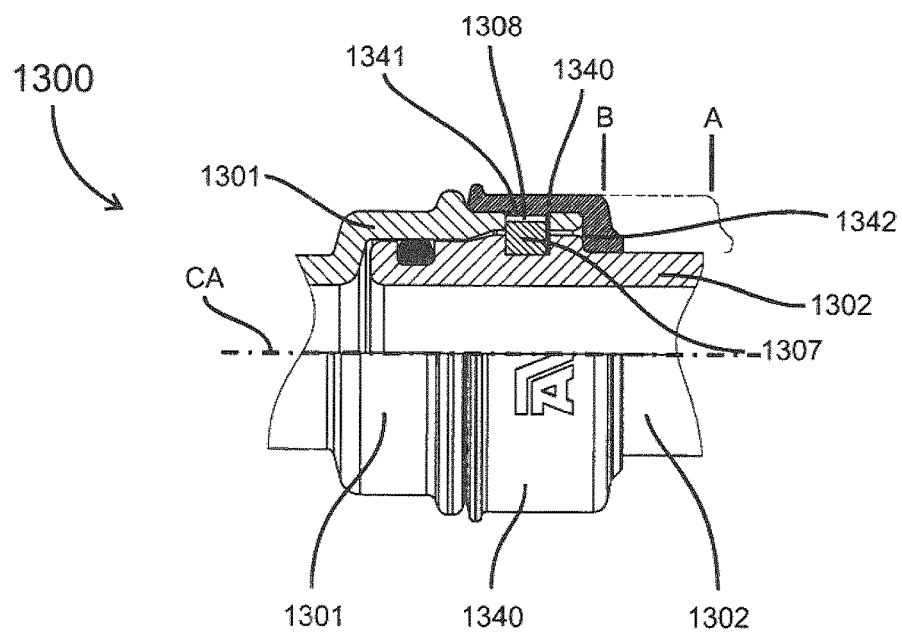

FIG. 13 a side elevational view partially cut away of a pipe coupling according to a further embodiment comprising another protective sleeve.

Figure 14:
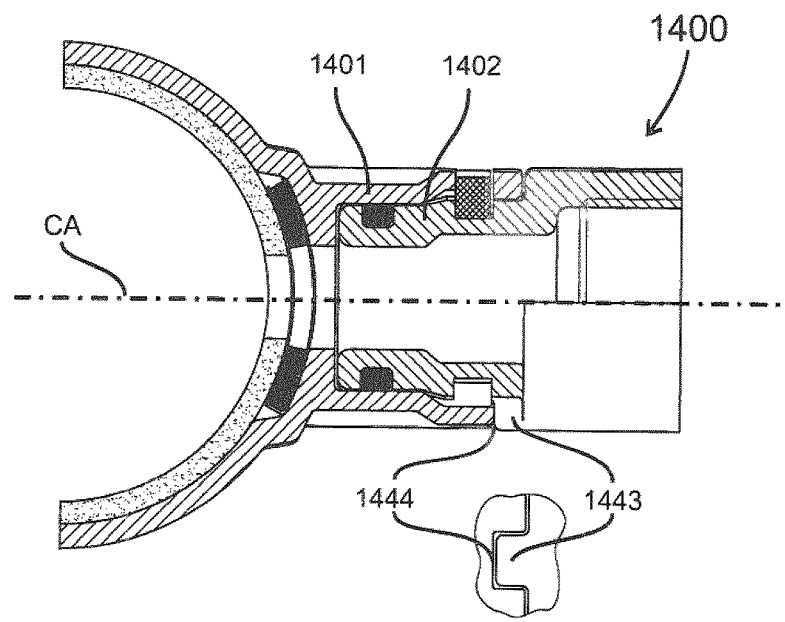

FIG. 14 an axial cross-sectional view of a threadless pipe coupling according to a further embodiment comprising stopping means.

Figure 15:
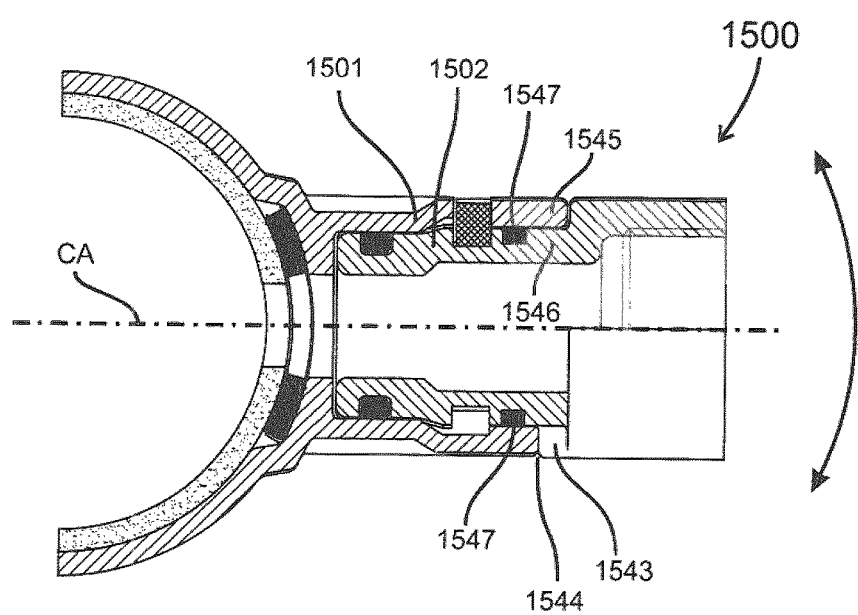
Figure 16:
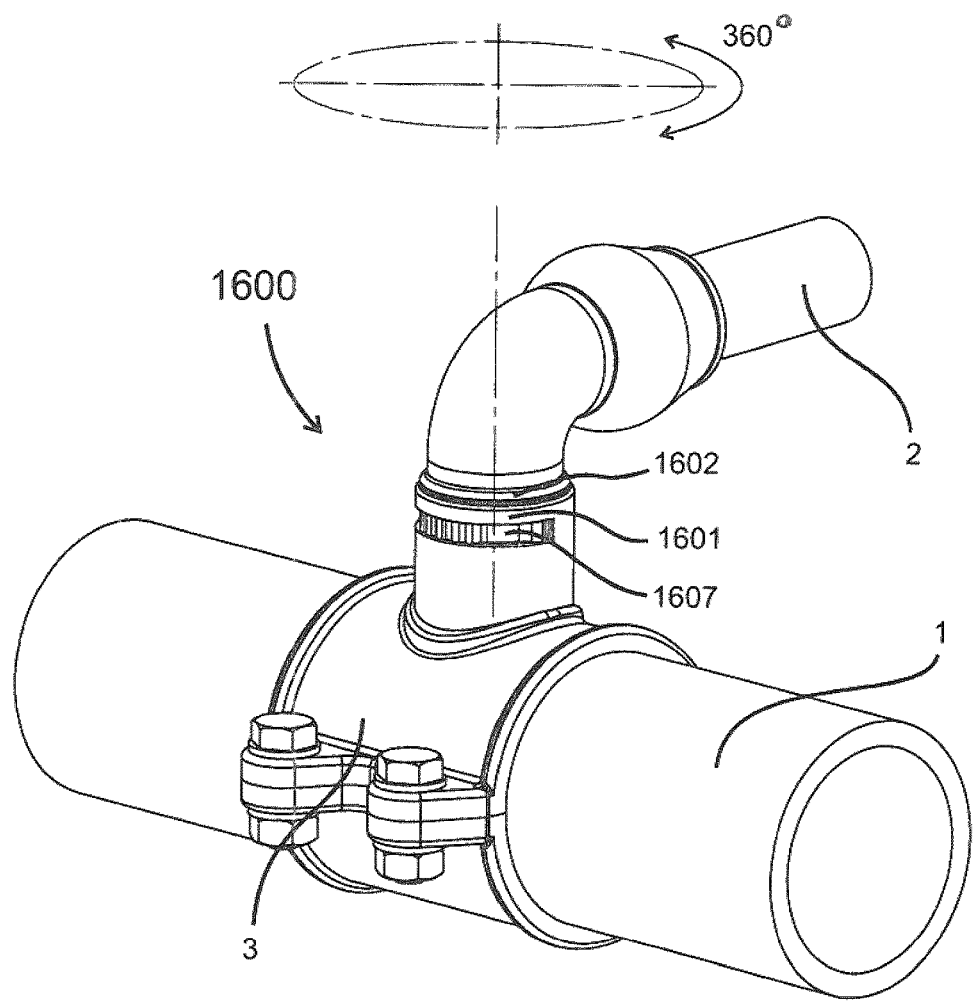

FIG. 15 an axial cross-sectional view of a threadless pipe coupling according to a further embodiment comprising stooping means and radial guiding/centering means, and FIG. 16 a perspective view of a saddle clamp tapping joint comprising a pipe coupling according to a further embodiment.

Referring to FIG. 1, a tapping joint for branching off a side line 2 from a main line 1 by means of a saddle clamp 3 may comprise a threadless pipe coupling 100. The saddle clamp 3 may comprise a socket 101 forming, the female part of the pipe coupling 101. A pipe end of the side line 2 or, as shown in the figure, an adapter piece 4 receiving the side line 2 in a sealing and gripping engagement may be provided with a plug 102 forming the mate part of the pipe coupling 100, which is introduced into the socket 101 in an insertion direction 10, whereby a fluid passage is formed that is sealed by a sealing member 103 arranged between a circumferential outer surface 104 of the plug 102 and a cooperating inner surface 105 of a circumferential side wall 106 of the socket 101. The sealing member 103 comprises a first seal surface 160 pointing in the same direction as the insertion direction and an oppositely placed second seal surface 161. The plug 102 is retained in the socket 101 by means of a locking member 107 that is inserted in a transverse direction perpendicular to the insertion direction 10 through a slot 108 in the circumferential side wall 106 of the socket 101 when the plug 102 is placed in the socket 101. The locking member is horseshoe-shaped and engages around the plug 102 in a groove 109 provided on the circumferential outer surface 104 of the ping 102 behind the sealing member 103 as seen in the insertion direction 10, wherein the ends of the locking member 107 in the mounted position thereof are located between the outer surface 104 of the plug 102 and the circumferential side wall 106 of the socket 101 as seen in a radial direction. In the mounted position, the locking member 107 does not project outside the contour of the socket 101. Thereby, the locking member 107 is protected from interference with influences from the outside that might lead to the inadvertent removal of the locking member 107 and thus an undesired separation of the pipe coupling 100.

The locking member 107 has a first axial end face 110 that cooperates with an axial abutment face 111 on the plug 102, and a second axial end face 112 opposite to the first end face 110 that cooperates with an axial contact surface 113 on the socket 101 so as to take up tensile axial forces pulling plug and socket apart from each other, thereby retaining the plug 102 in the socket 101. Furthermore, the first and second axial end faces 110, 112 of the locking member 107 may cooperate with an axial contact surface 114 on the socket 101, and an axial abutment face 115 on the plug 102, respectively, so as to prevent the plug 102 from being inserted into the socket 101 beyond a pre-determined insertion depth and locking the plug 102 in a fixed position with respect to the socket 101. In the shown embodiment, the axial abutment faces 111, 115 of the plug 102 are formed by the axial side walls of the groove 109. The bottom of the groove 109 defines the diameter of the waist of the plug 102 at the location of the locking member 107. The axial contact surfaces of the socket may be formed by the axial side was of the slot 108, by grooves (not shown), as well as by radially inward projecting flanges, all provided on the circumferential side wall 106 of the socket 101.

Referring to FIGS. 2-4, a pipe coupling 200 comprises a socket 201 and a plug 202. The receiving cavity of the socket 201 comprises cylindrical chambers 216, 218, 215, and a tapered chamber 217 connecting the cylindrical chamber 218 with the cylindrical chamber 216. The chambers 216, 217, 218, 219 are defined by the circumferential wall 206 of the socket 201. The circumferential outer surface 204 of the plug 202 has cylindrical surfaces 220, 221 cooperating with the cylindrical chambers 216, 219 of the socket 201 for alignment when the plug 202 is placed in the socket 201. In particular, cylindrical surface 220 cooperates with the cylindrical chamber 216, and the cylindrical surface 221 cooperates with the cylindrical chamber 219. The plug 202 further comprises a radial flange 222 with an axial abutment face 223 that directly interacts with an axial contact surface 224 on the socket 201 to define the insertion depth and to prevent tilting of the inserted plug 202 with respect to the socket 201. A sealing member (not shown) is preferably premounted on the plug 202, held in place in a circumferential channel 225 provided at the tip of the plug 202. The sealing member slightly projects out of the channel 225 and a fluid tight seal is formed by compressing the sealing member between the bottom of the channel 225 on the circumferential outer surface 204 of the plug 202 and the inner surface of the cylindrical chamber 216 of the socket 201. To facilitate easy insertion of the plug 202 into, the socket 201 when a sealing member is pre-mounted in the channel 225 of the plug 202, the inner diameter of the cylindrical chamber 219 is larger than or equal to the outer diameter of the expanded sealing means mounted in the channel 225 of the plug 202. Further, the inner diameter of the cylindrical chamber 218 is larger than the outer diameter of the expanded sealing means mounted in the channel 225 of the plug 202, and the tapering chamber 217 provides a smooth transition from the larger inner diameter of the cylindrical chamber 218 to the smaller diameter of the cylindrical sealing chamber 216. The transition may for example be conical or smoothly rounded. The plug 202 is secured in the inserted position by means of a locking member 207. The locking member 207 is inserted through a half-circular slot 208 in the circumferential side wall 206 of the socket 201 in the region of the circular chamber 218, wherein the slot 208 is transversely oriented with respect to the axial direction indicated by the central axis CA. In its mounted position, the locking member 207 engages around the plug 202 in a groove 209, which is aligned with the slot 208 when the plug 202 is correctly placed in the socket 201.

The locking member 207 is horseshoe-shaped with a first leg 226 and a second leg 227, wherein distal ends 228, 229 of the first leg 226 and the second leg 227 are separated by a gap and proximal ends opposite to the distal ends are connected to each other by a bridge portion 230. The bottom of the groove 209 defines a waist et the plug 202 at the location where the locking member 207 is mounted. The locking member 207 is made of an elastic material and the gap between the distal ends 228, 229 of the locking member 207 in its relaxed state is less than the diameter of the plug 202 at the waist in the bottom of the groove 209. The locking member 207 is mounted by inserting the locking member 207 transversely through the slot 206 into the groove 209 with the distal ends 228, 229 first, and pushing the locking member 207 further in with a slight pressure applied to a pressure surface 231 on the bridge portion 230, thereby spreading the legs 226, 227 to slide around the bottom of the groove 209 until the lacking member 207 snaps into place so as to engage around the plug 202 in the groove 209. Advantageously, the distal ends of the locking member are appropriately shaped so as to facilitate spreading of the logs of the locking member as the locking member is transversely inserted through the slot to engage around the plug. To that end, the surface of the distal ends may be configured to be tangential to the outer surface of the plug where the locking member first meets the outer surface of the plug and further may be rounded to maintain a more or less tangential contact as the distal ends of the locking element slide over the outer surface of the plug during insertion.

Preferably, the locking member 207 is generally dimensioned such with respect to the diameter of the waist of the groove 209 that it, once mounted, is also in its relaxed state, thereby avoiding any continuous stress and potential failure of the material of the locking member 207 when the pipe coupling 200 is connected. When placed in the pipe coupling 200, the locking member 207 interacts via its axial end faces 210, 212 with the side walls 211, 213, 214, 215 of the groove 209 and of the slot 208 to keep the plug 202 locked in position in the socket 201. The axial end faces 210, 212 of the locking member 207 as well as the cooperating axial abutment faces 211, 215 of the plug 202 and the cooperating contact surfaces 213, 214 of the socket 201 are planar, parallel to each other and at least one surface inclined to the radial direction.

The pipe coupling 200 may be disconnected by simple removing the locking member 207 from the groove 209 through slot 208, and pulling the plug 202 out of the socket 201. To facilitate easy intentional removal, the locking member 207 preferably comprises gripping means, such as outwardly projecting ears 232, 233 on the legs 226, 227 for gripping the locking member with two fingers and snapping it out of its engaged position. To avoid unintentional removal of the locking means, e.g. by interference due to harsh treatment of the pipe coupling with digging tools, the distal ends 228, 229 of the locking member 207 are placed between the outer surface 204 of the plug 202 and the circumferential side wall 206 of the socket 201 as seen in a radial direction. Furthermore, the locking member 207 preferably does not project out of from a projected contour 234 of the socket 201 as seen in an end elevational view in the axial direction.

FIG. 5 and FIG. 6 show details of an embodiment of a pipe coupling, with a locking member 507 having convex conical axial end faces 510, 512 and a socket 501 with a transverse insertion slot 508 having concave conical axial side walls 513, 514 for cooperating with the convex conical end faces 510, 512 of the locking member 507. Accordingly, also the axial abutment faces of the corresponding plug (not shown) may have a concave conical surface corresponding to cooperating convex conical end faces of the locking member 507. Under axial load the thus inclined cooperating axial surfaces interact to generate a radially inward directed force on the locking member 507 so as to keep the locking member 507 in the engaged position.

The locking member comprises the first axis end face (510) and the second axial end face 512 placed oppositely the first end face 510 and the slot 508 comprises and are delimited by the axial contact surfaces 513, 514. The axial end faces 510, 512 are converging outwards in radial direction and the axial contact surfaces 513, 514 are also converging outwards in radial direction. The angle between the converging surfaces the apex angle is preferably 3-15°, more preferably 3-8°.

In the figure both axial end faces are inclined, converging outward and with the same angle. The same applies for the axial contact surfaces. However, the surfaces may also be formed so that at least one axial end face 510, 512 is inclined and the other end face is perpendicular to the longitudinal axis of the pipe coupling. The contact surface pointing towards an end face is formed with an equivalent angled surface.

FIGS. 5a and 6a show a modified embodiment of the pipe coupling shown in FIG. 5 and FIG. 6. The side walls/the axial contact surfaces 513, 514 are each provided with a circumferential recess 562 placed closest to the central axis. The end faces 510, 512 are provided with a circumferential shoulder 563. When the locking member 507 is placed in the insertion slot 508, the shoulder 563 is abutting the recess 562 providing an even more safe locking mechanism.

The smallest distance between the converging axial contact surfaces 514, 513 is d1 and the largest distance between the axial end faces 510, 512 is substantially d1. Thereby, it is possible to press the locking member down in the slot. Further, the fitting between the two parts sees to that the locking member is safely placed.

FIGS. 7-9 show, by way of example, further advantageous features on different embodiments of locking members for a threadless pipe coupling. The horseshoe-shaped locking member 707 shown in FIG. 7 comprises extension flaps 750, 751 hinged to the distal ends 728, 729 of the legs 726, 727. The extension flaps 750, 751 are configured to extend into and essentially fill the gap between the distal ends 728, 729 so as to form a closed ring or at least reduce the gap when the locking member 707 is mounted in any of the embodiments of a pipe-coupling according to the invention. The extension flaps 750, 751 do not contribute to the snap-on engagement of the locking member 707 onto the plug, but allow for increasing the effective axial engagement surface of the locking element and for increasing the fraction of the peripheral contour involved in the retaining/locking interaction, yet allowing for easily and quickly inserting the locking member 707 in the pipe coupling to engage fully around the plug. FIG. 8 shows different embodiments of locking elements comprising different types of gripping means 632, 833, 835, 836, 837, 838. The different types of gripping means 832, 833, 835, 836, 837, 838 may be employed independently or in combination with each other. Apart from ears 832, 833 arranged at the legs of the locking element, such gripping means may comprise bosses 825 on top of the bridge portion, projections/noses 836, 837 on the side of the bridge portion configured for gripping by hand, and/or recesses/pockets 838 arranged on the outside of the locking member and configured for gripping by a tool.

The locking member may advantageously be shaped so as to increase flexibility in the radial direction white enhancing stiffness of the locking member in the axial direction. FIG. 9 shows such an embodiment of a locking member 907 that may be made of e.g. a plastic material, or from a metal such as stainless steel, where the shape is undulated in the peripheral/tangential direction, whereas the shape is linearly extruded in the axial direction, in addition to controlling the flexibility, the undulation also provides gripping means.

FIG. 10 shows a perspective view of a socket 1001 with a transverse insertion slot 1008 and the corresponding locking element 1007. The slot 1008 is provided with a protective rim 1039 surrounding the slot 1008 so as to protect the locking member 1007 in its inserted position from inadvertent interference with influences from the outside.

FIG. 11 shows a cross-sectional end view of a pipe coupling 1000 in the axial direction. The pipe coupling 1000 comprises the socket 1901, a plug 1002 placed in the socket 1001, and the locking member 1007 in its inserted position engaged around the plug 1002. The distal ends 1023, 1029 of the locking member 1007 are placed protected from outside interference between the circumferential side wall 1006 of the socket 1001 and the outer surface 1004 of the plug 1002. The locking element is provided with a pressure surface 1031 comprising bosses 1035 on top of the bridge portion of the locking element 1007, and ears 1032, 1033 projecting radially outward from the legs 1026, 1027 on the side of the locking element. The protective rim 1039 provides a projected contour 1034 as seen in the axial projection of FIG. 11 which fully encloses the contour of the locking element 1007 in its inserted position, thereby protecting the locking element 1007 from unintentional removal as discussed above.

FIG. 12 shows a further embodiment of a pipe coupling 1200 comprising a socket 1201 and a plug 1202 locked together by leaking member 1207. The pipe coupling 1200 further comprises a protective sleeve 1240 which is slideable between an first, open position A on the socket 1201, where the insertion slot 1208 of the socket 1201 is accessible, and a second, closed position B, where any gap at the outer junction 1242 between the plug 1202 and the socket 1201 as well as the insertion slot 1208 are covered by the protective sleeve 1240. Preferably, the protective sleeve 1240 has an inwardly projecting latching nose 1241 engaging the slot 1208 when the sleeve 1240 is in the closed position B. The protective sleeve is applicable for the embodiments shown in FIG. 1-6a.

An alternative embodiment of a pipe coupling 1300 comprising a protective sleeve 1340 is shown in FIG. 13 and also applicable for the embodiments shown in FIG. 1-6a. The pipe coupling 1300 also has a socket 1301 and a plug 1302 locked together by a locking member 1307. The protective sleeve 1340 is slideable between an first, open position A on the plug 1302, where the insertion slot 1308 of the socket 1301 is accessible when the plug 1302 is placed in the socket 1301, and a second, closed position B, where any gap at the outer junction 1342 between the plug 1302 and the socket 1301 as we as the insertion slot 1308 are covered by the protective sleeve 1340. Preferably, also the protective sleeve 1340 has an inwardly projecting latching nose 1341 engaging the slot 1308 when the sleeve 1340 is in the closed position B. The protective sleeve 1240, 1340 effectively prevents any dirt ingression into the locking mechanism and further into the sealing portion of the pipe coupling 1200, 1300, and furthermore secures the locking member 1207, 1307 in its inserted position.

FIGS. 14 and 15 show further embodiments of a pipe coupling 1400, 1500, here implemented in a saddle clamp tapping joint for connecting a side line to a main line. The pipe couplings 1400, 1500 are provided with stopping means comprising a protrusion 1443, 1543 on the plug 1402, 1502 and a cooperating notch 1444, 1544 on the socket 1401, 1531. The embodiment shown in FIG. 15 further comprises extension portions 1545, 1546 on the socket 1501 and plug 1502, respectively, and an additional guiding/centering ring 1547 to prevent tilting of the plug 1502 with respect to the socket 1501 as indicated, by the double arrow. The socket/plug pipe coupling may be integrally formed with the pipe end at which it is provided, as shown for the socket part 1401, 1501 on the saddle clamp 3, or may also be provided as an adapter piece, which is attachable to any further components, e.g. by means of a conventional thread as indicated in the far end at the plug part 1402, 1502 of the pipe couplings 1400, 1500 shown in FIGS. 14 and 15.

FIG. 16 shows the use of a freely rotatable, embodiment of a pipe coupling 1600 for branching off a building line 2 from a horizontal main supply line if using a saddle clamp 3 for providing a vertical tapping joint from the top. The upper portion of the saddle clamp 3 is provided with a socket 1601 receiving a plug 1602, which is locked to the socket 1601 by a locking element 1607. The plug 1602 is furthermore connected to the horizontal building line 2 via a 90 degrees bend. Since the plug 1601 is configured to be freely rotatable with respect to the socket 1602 around the vertically oriented central axis CA, the building line 2 may easily be adjusted to point in an arbitrary horizontal direction, thereby considerably simplifying the installation of such building lines.

While the invention has been discussed with respect to exemplary embodiments, alternative and equivalent variations of these embodiments are directly apparent to the skilled person. For example, instead of using the pipe coupling in a tapping joint, the pipe coupling may also be used for establishing, operating and disconnecting any other fluid connection in a supply network, such as for connecting pipe ends to each other, for inserting a valve in a pipe line, for temporarily connecting a tapping drill, or the like. Also, plug and socket may obviously be interchanged to replace a socket for a plug and vice versa, without leaving the scope of the present invention.

REFERENCE NUMBERS

1 main line
2 side line
3 saddle clamp
4 adapter piece
10 plug insertion direction
x00 pipe coupling
x01 socket
x02 plug
x03 sealing member
x04 circumferential outer surface of the plug
x05 inner surface of the circumferential side wall of the socket
x06 circumferential side wall of the socket
x07 locking member
x08 transverse insertion slot
x09 circumferential groove
x10, x12 first and second axial end face
x11, x15 axial abutment faces
x13, x14 axial contact surfaces
x16, x18, x19 cylindrical chambers of the socket
x17 tapering chamber of the socket
x20, x21 cylindrical portions of the circumferential outer surface of the plug
x22 radial flange
x23 axial abutment face
x24 axial contact face
x25 circumferential channel
x26, x27 legs
x28, x29 distal ends
x30 bridge portion
x31 pressure surface
x32, x33 gripping means (ears)
x34 projected contour of the socket
x35 gripping means (bosses)
x36, x37 gripping means (projections/noses/recesses)
x38 gripping means (recesses/pockets)
x39 protective rim
x40 protective sleeve
x41 latching nose
x42 outer junction between plug and socket
x43, x44 stopping means
x45, x46 extension
x47 guiding/centering means
x50, x51 extension flaps
x60 first seal surface
x61 second seal surface
x62 circumferential recess
x63 circumferential shoulder
A open position
B closed position
CA central axis

The invention claimed is:

1. A threadless pipe coupling comprising:
a socket;
a plug configured for being inserted into the socket in an insertion direction;
a sealing member arranged between a circumferential outer surface of the plug and a cooperating inner surface of a circumferential side wall of the socket, so as to provide a fluid tight seal when the plug is placed in the socket, said sealing member comprising a first seal surface facing in the insertion direction and an oppositely facing second seal surface, wherein a locking member is configured to retain the plug in the socket when the locking member is inserted in a transverse direction being perpendicular to the insertion direction through a slot in the circumferential side wall of the socket to engage around the plug at a location near the second seal surface, and when the locking member is in a mounted position, each of a plurality of ends of the locking member is located between the circumferential outer surface of the plug and the circumferential side wall of the socket as seen in the transverse direction, the locking member comprising a first axial end face and a second axial end face placed oppositely the first axial end face, and the slot being at least partially bound by axial contact surfaces of the socket,
wherein each of the axial end faces is angled relative to the transverse direction, and each of the axial contact surfaces is angled relative to the transverse direction for cooperating with the axial end faces, whereby under an axial load acting along the transverse direction, the axial contact surfaces interact with the axial end faces to generate a force acting on the locking member in the transverse direction so as to keep the locking member in an engaged position.

2. The threadless pipe coupling of claim 1, wherein at least one axial end face is inclined and the other axial end face is perpendicular to a longitudinal axis of the pipe coupling and the axial contact surfaces, each pointing towards one of the axial end faces and being formed with an equivalent angled surface.

3. The threadless pipe coupling of claim 1, wherein a portion of at least one of the axial contact surfaces defines a circumferential recess placed in an area adjacent to a central axis of the pipe coupling, and the facing axial end face is provided with a circumferential shoulder adapted to engage the portion defining the circumferential recess when the locking member is placed in the slot.

4. The threadless pipe coupling of claim 1, wherein the locking member in an inserted position does not extend outside a projected contour of an exterior surface of the socket as seen in projection along an axial direction.

5. The threadless pipe coupling of claim 1, wherein one or more grips are provided on the locking member for gripping the locking member for removing the locking member from an inserted position.

6. The threadless pipe coupling of claim 1, wherein the pipe coupling comprises a plurality of locking members.

7. The threadless pipe coupling of claim 1, wherein the sealing member is pre-mounted on the circumferential outer surface of the plug.

8. The threadless pipe coupling of claim 1, wherein the pipe coupling comprises a plurality of sealing members.

9. The threadless pipe coupling of claim 1, wherein the pipe coupling further comprises one of a radial guide and axial support configured to reduce any slackness of the pipe coupling with respect to one of tilting and canting of the plug with respect to the socket.

10. The threadless pipe coupling of claim 1, wherein the circumferential outer surface of the plug and the cooperating inner surface of the circumferential side wall of the socket each have a circular cross-section.

11. The threadless pipe coupling of claim 1, wherein the plug is freely rotatable with respect to the socket around a central axis parallel to an axial direction, wherein the central axis is parallel to the insertion direction, and the axial direction is parallel to the insertion direction.

12. The threadless pipe coupling of claim 1, which includes a stop configured to prevent rotation of the plug with respect to the socket around a central axis parallel to an axial direction.

13. The threadless pipe coupling of claim 1, further comprising a protective sleeve, wherein the protective sleeve encapsulates the locking member in an inserted position and seals the slot of the socket.

14. The threadless pipe coupling of claim 1, wherein the axial end faces are inclined and converge outwardly with an identical angle, and the axial contact surfaces converge so as to have an equivalently formed angled surface.

15. The threadless pipe coupling of claim 14, wherein a smallest distance between the converged axial contact surfaces is d1 and a largest distance between the axial end faces is substantially d1.

16. The threadless pipe coupling of claim 1, wherein a first one of the axial end faces of the locking member cooperates with an axial abutment face of the plug, and a second one of the axial end faces of the locking member opposite to the first end face cooperates with one of the axial contact surfaces of the socket so as to take up tensile axial forces pulling the plug and socket apart from each other.

17. The threadless pipe coupling of claim 16, which includes a plurality of portions that extend perpendicular to an axial direction and parallel to each other, the portions being selected from the group consisting of: (a) at least one of the axial end faces of the locking member; (b) the cooperating abutment face of the plug; and (c) the cooperating contact surface of the socket.

18. The threadless pipe coupling of claim 16, wherein at least one of the axial end faces of the locking member is convex conical, and one of the cooperating abutment face on the plug and the cooperating contact surface of the socket is concave conical so as to press the locking member radially inwardly when the cooperating inclined axial surfaces are pressed towards each other as the axial load is applied to the pipe coupling.

19. The threadless pipe coupling of claim 1, wherein the locking member is horseshoe-shaped having a first leg and a second leg, distal ends of the first leg and the second leg being separated by a gap and proximal ends opposite to the distal ends being connected to each other by a bridge.

20. The threadless pipe coupling of claim 19, wherein the locking member is a spring clip configured to engage around the plug by snap-fit.

21. The threadless pipe coupling of claim 19, wherein the locking member is provided with extension flaps hinged to the distal ends of the first leg and the second leg.

22. A pipe coupling comprising:
a socket configured to be coupled to a pipe, the socket extending along a longitudinal axis, the socket having an outer socket wall that defines a socket slot;
a plug configured to be received by the socket and non-threadably coupled to the socket, the plug having an outer plug wall that defines a plug slot, wherein the plug slot is configured to be aligned with the socket slot;
a seal configured to be positioned between the socket and the plug; and
a clip attachable to the plug, the clip being configured to:
  (a) be inserted through the socket slot;
  (b) at least partially fit within the plug slot;
  (c) maintain an axial position of the plug relative to the socket when the plug is subject to an axial force that pulls the plug away from the socket, wherein the axial force acts along the longitudinal axis; and
  (d) cooperate with the socket to translate at least part of the axial force to a radial force acting along a radial axis that is perpendicular to the longitudinal axis, wherein the radial force urges the clip toward the plug.

23. The pipe coupling of claim 22, wherein the clip comprises:
(a) a rigid axial portion extending along the longitudinal axis when the clip is attached to the plug, the rigid axial portion configured to be inserted through the socket slot and into at least part of the plug slot so as to couple the plug to the socket, the rigid axial portion being configured to:
  (i) withstand the axial force during the pulling to retain the axial position; and
  (ii) cooperate with the socket to translate the at least part of the axial force to the radial force, wherein the radial force urges the clip toward the plug in a radial direction to facilitate the attachment of the plug to the socket during the pulling; and
(b) a plurality of flexible legs extending from the rigid axial portion, the flexible legs configured to move between: (i) a predisposed position wherein there is a first gap between the flexible legs; and (ii) a flexed position wherein there is a second gap between the legs, the second gap being greater than the first gap,
wherein the rigid axial portion has a rigidity that is maintained despite the axial force so as to maintain the axial position,
wherein at least part of the clip is accessible through the socket slot when the clip is attached to the plug, and
wherein the clip is configured so as not to protrude beyond the outer wall of the socket.

24. The pipe coupling of claim 22, wherein the outer socket wall is configured so that the socket slot comprises:
a first slot length extending along the longitudinal axis; and
a second slot length extending along the longitudinal axis, wherein:

(a) the second slot length is located radially outward from the first slot length; and
(b) the second slot length is less than the first slot length.

25. A pipe coupling comprising:
a socket configured to be coupled to a pipe, the socket comprising:
  a length extending along a longitudinal axis;
  a radius extending along a radial axis, wherein the radius is positioned about a center; and
  an outer socket wall that defines a socket slot;
a plug configured to be received by the socket and coupled to the socket, the plug comprising an outer plug wall that defines a plug slot, wherein the plug slot is configured to be aligned with the socket slot;
a seal configured to be positioned between the socket and the plug; and
a retaining member configured to be coupled to the plug, wherein the retaining member is structured to:
  (a) be at least partially inserted through the socket slot;
  (b) at least partially fit within the plug slot;
  (c) maintain an axial position of the plug relative to the socket when the plug is subject to a first force acting along the longitudinal axis; and
  (d) cooperate with the socket to convert at least part of the first force to a second force,
wherein the second force acts along the radial axis to urge the retaining member toward the center so as to enhance the coupling of the retaining member to the plug.

26. The pipe coupling of claim 25, wherein:
the outer socket wall is configured so that the socket slot comprises:
  a first slot length extending along the longitudinal axis; and
  a second slot length extending along the longitudinal axis, wherein:
    (a) the second slot length is located radially outward from the first slot length; and
    (b) the second slot length is less than the first slot length;
the retaining member comprises a wedge-shaped portion configured to be engaged with the outer socket wall, the wedge-shaped portion comprising:
  a first dimension extending along the longitudinal axis; and
  a second dimension extending along the longitudinal axis, wherein:
    (a) the second dimension is located radially outward from the first dimension; and
    (b) the second dimension is less than the first dimension.

27. The pipe coupling of claim 25, wherein:
the outer socket wall comprises a first socket surface and a second socket surface spaced apart from the first socket surface;
the first and second socket surfaces define the socket slot;
the first socket surface extends in a first socket plane;
the second socket surface extends in a second socket plane;
each of the first and second socket planes is angled relative to the radial axis;
the retaining member comprises a first retaining surface and a second retaining surface spaced apart from the first retaining surface;
the first retaining surface extends in a first retaining plane;
the second retaining surface extends in a second retaining plane; and
each of the first and second retaining planes is angled relative to the radial axis.

28. A pipe coupling comprising:
a locking element configured to couple a first pipe to a second pipe, wherein:
  each of the first and second pipes comprises a center and radius extending from the center; and
  each of the first and second pipes defines a fluid passage configured to extend along a passage axis, the locking element comprising:
    a first pipe engager configured to engage the first pipe; and
    a second pipe engager configured to be at least partially inserted into a slot defined by the second pipe, the second pipe engager comprising:
      a first face facing in a first direction along the passage axis when the second pipe engager is at least partially inserted into the slot; and
      a second face facing in a second direction along the passage axis when the second pipe engager is at least partially inserted into the slot, wherein the second direction is opposite of the first direction,
wherein the first face extends along a first side axis,
wherein the second face extends along a second side axis, wherein the first and second side axes intersect with each other,
wherein the first and second faces are configured to cooperate with the second pipe so that when a separation force is applied along the passage axis to urge the first and second pipes to separate from each other, the first and second faces translate a portion of the separation force to a radial force which urges the locking element toward at least one of the centers,
wherein the first pipe comprises a socket,
wherein the second pipe comprises a pipe line,
wherein the first pipe engager comprises a plurality of legs,
wherein the second pipe engager comprises a bridge portion, and
wherein the pipe coupling comprises a seal configured to be positioned between the socket and the pipe line.

* * * * *